US007907110B2

(12) United States Patent
Vergnes et al.

(10) Patent No.: US 7,907,110 B2
(45) Date of Patent: Mar. 15, 2011

(54) DISPLAY CONTROLLER BLINKING MODE CIRCUITRY FOR LCD PANEL OF TWISTED NEMATIC TYPE

(75) Inventors: Alain Vergnes, Trets (FR); Sebastien Younes, Pourrieres (FR); Jerome Alingry, Aix en Provence (FR)

(73) Assignee: Atmel Corporation, San Jose, CA (US)

( * ) Notice: Subject to any disclaimer, the term of this patent is extended or adjusted under 35 U.S.C. 154(b) by 702 days.

(21) Appl. No.: 11/696,574

(22) Filed: Apr. 4, 2007

(65) Prior Publication Data

US 2008/0246746 A1 Oct. 9, 2008

(51) Int. Cl.
*G09G 3/36* (2006.01)
*G09G 5/00* (2006.01)
*G06F 3/038* (2006.01)

(52) U.S. Cl. ............................ 345/98; 345/204; 345/94

(58) Field of Classification Search .................. 345/204, 345/690, 691, 211–213, 87–104
See application file for complete search history.

(56) References Cited

U.S. PATENT DOCUMENTS 4,191,956 A * 3/1980 Groothuis .................... 345/634
4,470,042 A 9/1984 Barnich et al.
4,724,431 A 2/1988 Holtey et al.
4,831,369 A 5/1989 Lecourtier
5,726,668 A 3/1998 Clement
5,821,910 A 10/1998 Shay
6,388,661 B1 * 5/2002 Richards ...................... 345/204
6,636,190 B2 10/2003 Hirakata et al.
6,903,716 B2 6/2005 Kawabe et al.
2003/0151616 A1 * 8/2003 Morita ......................... 345/690
2005/0073490 A1 4/2005 Kojima et al.
2005/0163506 A1 7/2005 Ikeda et al.
2006/0087503 A1 4/2006 Sasaki et al.
2006/0284863 A1 * 12/2006 Imayoshi et al. ............. 345/204

FOREIGN PATENT DOCUMENTS

EP 1255241 A1 11/2002
EP 1763015 A1 3/2007
WO WO-2008/124051 A1 10/2008

OTHER PUBLICATIONS

International Application Serial No. PCT/US2008/004383, International Search Report mailed Jul. 23, 2008, 4 pgs.
"International Application Serial No. PCT/US2008/004383, Written Opinion mailed Jul. 23, 2008", 4 pgs.

* cited by examiner

*Primary Examiner* — Bipin Shalwala
*Assistant Examiner* — Ilana Spar
(74) *Attorney, Agent, or Firm* — Schwegman, Lundberg & Woessner, P.A.

(57) ABSTRACT

A display controller for providing signals to a discrete display panel unit comprising: a set of registers configured to hold data to be displayed; a first logic circuitry connected to the set of registers and configured to receive the data from the set of registers, generate the signal waveforms required by the display panel according to the data, and provide the signal waveforms to the display panel; a second logic circuitry connected to the first logic circuitry, the second logic circuitry configured to generate timing signals for timing the first logic circuitry providing the waveforms to the display panel; and a resistor ladder connected to the second logic circuitry, the resistor ladder configured to generate intermediate voltages required to drive the display panel, and configured to receive the timing signals, wherein the controller is configured to automatically and periodically disable the resistor ladder according to one of the timing signals.

21 Claims, 9 Drawing Sheets

DISPLAY CONTROLLER BLINKING MODE CIRCUITRY FOR LCD PANEL OF TWISTED NEMATIC TYPE

BACKGROUND OF THE INVENTION

1. Field of the Invention

The present invention relates to an architecture for display controllers. More specifically, the present invention relates to an architecture for Twisted Nematic Liquid Crystal Display (TN-LCD) controllers embedded in microcontrollers.

2. Background

The present invention is typically provided in a microcontroller-type integrated circuit, but can also be provided in any other type of integrated circuit-driven display panel, especially passive Twisted Nematic Liquid Crystal Displays (TN-LCD). These kind of display panels are well known and can be found in many electronic devices, especially in battery powered devices such as watches, games, basic displays in cameras, etc.

When powered by batteries, the electronic device must reduce its consumption as much as possible to improve the battery lifetime. Therefore, reduced power modes of operation have been designed. For example, when only one static image must be displayed, the powered circuitry can be limited to the display panel itself and the minimum logic circuitry necessary to generate the required signals, rather than powering the entire microcontroller logic including the microprocessor.

Another example is the blinking mode where the image is periodically blanked. This mode can be implemented in different ways resulting in different power consumptions. For a simple LCD panel having a single common backplane terminal, if the segment signals and backplane have the same waveform, the pixels are not visible (not energized), but the signals are toggling and, therefore, some current flows in parasitic capacitances that are inherent to any digital circuitries. The present invention prevents the LCD terminals from this switching during the blank period, thereby reducing the power consumption for the blank period.

However, this power consumption reduction is not important for these single backplane LCD panels. For example, when using LCD panels for basic scientific calculators (for example, a 8×40 dot panel is used in order to display characters using 7×5 dot fonts) or small/basic images/icons, there are not 8×40 (320) terminals in the LCD panel or in the controller driving it because of the resulting associated cost for the integrated circuit packages. These kind of panels use the well known multiplexed technique.

This multiplexing technique involves special waveforms that require signals to be slightly energized even if pixels of the image are not visible. Additionally, intermediate voltage levels must be available for these special waveforms. In order to generate these intermediate voltages, a resistor ladder is often used, which consumes DC current.

The present invention provides circuitry that prevents the terminals of the LCD panel from switching during the period the image is blanked. This prevention is achieved by setting these terminals to logic 0, thereby eliminating the need for any intermediate voltage. As a result, the resistor ladder activity can be disabled. The power consumption is reduced in this mode of operation (blinking).

FIG. 1 represents a simple microcontroller with an LCD display controller. Microcontroller 100 comprises a microprocessor 101 configured to access peripheral circuitries like timers 105, UART 106, and LCD controller 107. The data exchanges are performed by means of the system bus 120, which comprises (not shown) a read data bus carrying data from peripherals to microprocessor 101, a write data bus carrying data from microprocessor 101 to peripherals, an address bus and control signals to indicate transfer direction on system bus 120. Since the address bus of the system bus 120 is shared by all the peripherals, there is a need to decode the value carried on this bus to select one peripheral at a time. A circuitry 102 acts as an address decoder by receiving the address bus (part of system bus 120), and provides select signals 121, 122, 123, 124, and 125. These select signals will be read by peripheral circuits, such as on-chip memories 103, interrupt controller 104, timers 105, UART 106, and LCD controller 107, in order to take into account values carried on system bus 120. Timers 105 may be connected to interrupt controller 104 by line 126. Microcontroller 100 may further comprise clock terminal 143 and reset terminal 144.

On-chip memories 103 allows for the storage of the application software processed by microprocessor 101. Microcontroller 100 is powered by means of a different set of terminals 140 and 141. Terminals 140 comprise a series of physical access terminals (PADs), some for providing VDD and some for providing GND. Terminals 140 power the main parts of the microcontroller 100, including microprocessor 101, address decoder 102, on-chip memories 103, interrupt controller 104, timers 105, and UART 106. Terminal 141 powers the LCD display controller 107. The boundary for the different power supplies is represented by dotted line 150.

The LCD display controller 107 may be the only circuitry to be powered in microcontroller 100 for power consumption considerations. This LCD display controller 107 can drive an LCD panel 108 by means of line 127 and terminals 142. In order to display an image, the software located in on-chip memory 103 is fetched by microprocessor 101 by means of read accesses performed on system bus 120.

The on-chip memory 103 is selected (signal 123 is active) as soon as the address value of the address bus matches the address range allocated for the on-chip memory 103. The address decoder 102 is designed accordingly. The memory 103 provides the corresponding data onto system bus 120, which is read by microprocessor 101 and processed accordingly.

The image to display on a twisted nematic passive LCD panel can be considered as a bit stream, one bit for each LCD dot. If the number of dot exceeds the system bus 120 data size, several accesses will be required to transfer the full image contained in on-chip memory 103 to display controller 107. Therefore, the display controller 107 must contain an image buffer that can be fully loaded by decoding different access on the system bus 120 when the associated select signal 125 is active.

When the microprocessor 101 is instructed to load an image into display controller 107, write accesses are performed on system bus 120. As soon as all write accesses have been performed, there is nothing more to do for the microprocessor 101 and, therefore, it can be powered off. For example, just after having finished transferring the image, the microprocessor 101 can perform an access into UART module 106, which would be externally connected (not shown) to a companion chip to manage the power of the microcontroller 100. For example, the companion chip would receive through RXD/TXD connections a data that would instruct the regulator driving terminals 140 (VDD/GND) to switch off.

FIG. 2 provides the architecture details of display controller 107. The display controller circuitry 200 is connected to the system bus 224 to receive and provide data to the microprocessor. A first buffer of data ("user holding buffer") 204, connected to system bus 224, comprises a series of registers to store the bit stream for the image to display. These registers can be loaded with the data value carried on system bus 224 only if the address bus carries a specific value (one for each register). Therefore, there is a need for an internal address decoder (not shown, but different from address decoder 102 in FIG. 1).

The display controller circuitry 200 also comprises a second buffer of data ("display frame buffer") 205, which is connected to user holding buffer 204 contains a copy of the bit stream that is stored in data buffer 204. Loading the frame buffer 205 with the content of the user holding registers is automatically performed by timing generation circuitry 202 asserting signal 231.

The display controller 200 comprises configuration registers 211 that can be accessed at different addresses than the user holding registers. Configuration registers 211 provide the mode of operations 201 of the display controller, which can include, but is not limited to, the blinking frequency signals "LCDBLKFREQ" and the display mode "DISPMODE" which can allow for addressing different types of LCD panels (1, 2, 3, 4 COMMON TERMINAL PANELS).

Considering the blinking mode, the displayed data results in two periods: one period with an energized image according to the bit stream located in the display frame buffer 205 and the other period where all dots are blanked. Therefore, the timing generation circuitry 202 provides a toggling signal 223, which clears the output of the multiplexer 207 when it is low (logical 0) and passes the output of multiplexer 207 when it is high (logical 1). It is possible to achieve this behavior by means of a set of AND gates 206.

The display controller 200 uses the multiplexing technique to provide data to LCD panel. Therefore, both internal buffers are organized accordingly. There are as many outputs as common to address in the LCD panel for each buffer. The multiplexed LCD panel consists of a series of terminals organized as a matrix. There are several common terminals usually called "COMMON." Each of these common terminals access several other terminals called "SEGMENT" of the LCD panels through a capacitor whose dielectric is filled with liquid crystal. For example, for a 10 COMMONS×64 SEGMENTS LCD panel, the display controller data buffer will be organized as 10 64-bit registers, as seen in FIG. 2 with reference to user holding buffer 204 and display frame buffer 205.

Therefore, these registers must be multiplexed. The display controller 200 comprises 64×10:1 multiplexer 207. These multiplexers have their select inputs driven by the timing generation module 202 by means of signal 220. Each register of the frame buffer 205 is periodically selected, and the period of selection for each register is called the "frame period." This frame period depends on the number of commons addressed on the LCD panel and also on other parameters, including the clock frequency divider (division of clock signal 232). The divider circuitry may be contained in the timing generation module 202. This clock frequency divider is not mandatory, but it is common to use a watch crystal oscillator (32.768 KHz) or an on-chip RC oscillator (cheaper than the crystal oscillator) to drive the display circuitry. Since this is a high frequency compared to image display frequency 50 to 100 Hz, there is a need to divide it. The 32.768 KHz clock is used because it comes from a crystal and, therefore, it is very accurate and is often used in other parts (not shown) of the microcontroller, such as the real time clock and periodic interval timer where timing accuracy is mandatory.

The output 225 of multiplexer 207 that is passed through AND gate 206 carries the data to be provided to SEGMENTS terminals of the LCD display panel, but it needs to be processed as it cannot be displayed in that form. This processing is achieved by means of waveform generator 209, which takes into account the type of LCD panel to be addressed. The type of LCD panel to be addressed is configured by user through signal 201 (DISPMODE).

Waveform generator module 209 provides different waveforms according to the data to be displayed (either energized pixel or non-energized, a pixel (or dot) being the area formed by the cross-over of a SEGMENT and a COMMON). The waveform also depends on the time slot location. During a COMMON terminal duration period, one can distinguish 2 different areas. These areas are signaled by timing generation circuitry 202 by means of signal 221.

Waveform generator 209 is a digital module and does not generate the direct waveform that is described in FIG. 4, but rather provides the command selection inputs of the associated analog multiplexers of switch array 203 via line 227. Analog switch array 203 is an array of analog multiplexers (one for each terminal of the LCD display panel) that select among four voltages provided by a resistor ladder 210. Resistor ladder 210 acts as a voltage divider, providing all required voltage values, for example ¾ VDD, ½ VDD, and ¼ VDD for up to 10 common terminals LCD panels, which are carried by signals 226.

Each analog multiplexer of module 203 comprises a selection input driven by the SEGMENT waveform generator 209 for segment terminals 229 via line 227 or the COMMON waveform generator 208 for the common terminals 230 via line 228. COMMON waveform generator 208 may be signaled by timing generation circuitry 202 by means of signal 222. There are analog multiplexers for common terminals 230 and analog multiplexers for segment terminals 229. They are all identical in their intrinsic structure, but their select inputs are not driven the same way to provide the waveforms shown in FIGS. 4 and 5.

FIG. 3 provides the details of a register within the display frame buffer 205 shown in FIG. 2. The display frame buffer contains a set of registers configured to store the data to be displayed on the LCD panel. These registers are organized according to the number of common and segment terminals of the LCD panel. For example, if an LCD panel is organized as 10 COMMONS×64 SEGMENTS, there are 10 registers of 64 bits each. Such a register may be made up of a set of DFFs 305 (one for each data bit, so 64 SEGs=64 DFFs) and an associated set of multiplexers 302 to re-circulate the data in order to store the data.

For each register (in our example, a 64-bit register), the select inputs of multiplexers 302 are connected to the same signal 307 driven by the timing generator module 202 in FIG. 2. When asserted, this signal allows, or enables, the display frame buffer to load the data carried by the user holding register and carried by line 301. The data carried on line 301 passes directly to the output 304 of DFF 305. When signal 307 is de-asserted, the data are re-circulated through multiplexer 302 and its output 303. The DFFs require a clock 306, which is the same for all the DFFs. This clock can be, for example, the same clock signal as the other DFFs of the other modules of the display controller.

The LCD panels do not allow DC current on their terminals. Therefore, a LCD driver must maintain a 0 Volt DC potential across each pixel. The resulting voltage across a pixel is the segment voltage minus the common voltage. If the average resulting voltage is below a particular voltage, the pixel is said to be "non-energized" because it will appear non-visible, whereas if the average voltage across the pixel is greater than the particular voltage, it will appear visible (colored in black in FIGS. 4 and 5).

For simplicity, FIGS. 4-6 show the waveforms for a three COMMON terminals LCD panel. The required specific voltages are ⅓ VDD and ⅔ VDD. Therefore, the resistor ladder will be different from the resistor ladder shown in FIG. 2. Only three resistors of the same value are required instead of four. Only the waveforms of COMMON 0, COMMON 1 and SEGMENT 0 are described. The same explanations apply to other terminals of the LCD display panel. COMMON 0 (COM0) is energized for ⅓ of the frame period. The frame periods are repeated over the time. It must be kept in mind that Vdc voltage must not appear across pixels and that SEGMENTS terminal voltage are propagated across three pixels (one for each common).

FIG. 4 illustrates multiplexed TN LCD waveforms for three COMMONS with one energized pixel. During the time when a common is energized (beginning of frame period for COM0), a toggling waveform is applied on COMMON 0 (COM0). For half the period the voltage is GND, then VLCD is applied. The remaining time in the frame period is composed of switching between ⅔ VLCD and ⅓ VLCD.

The second COMMON 1 (COM 1) is energized on the second part of the frame with the same type of waveform as COMMON 0. This is the same waveform compared to COM0, but right shifted by ⅓ of a frame period. COM2 (not shown) is the same as COM1, but right shifted by ⅓ of a frame period. As would be appreciated by one skilled in the art, the multiplexed mode of operation appears on COMMON terminals.

To get 0 Vdc voltage across pixel COM0-SEG0 when COM0 is energized, if the pixel must be visible (energized), then SEGMENT 0 (SEG0) has the opposite waveform of COM0. Therefore, the first ⅓ of the SEG0 waveform starts with VLCD, followed by GND. If the pixel (COM0-SEG0) must be blanked, i.e., non-energized and non-visible (not shown in FIG. 4), the waveform would start with ⅓ VLCD, then follow with ⅔ VLCD.

In the example of FIG. 4 where only one pixel (SEG0-COM0) is visible and one pixel (SEG0-COM1) is non-visible, the SEG0 waveform of the second ⅓ of the frame period starts with ⅓ VLCD, then follows with ⅔ VLCD. The pixel SEG2-COM0 being also non-visible, the third ⅓ of the frame period is the same as the second ⅓.

The difference of voltages across the pixel SEG0-COM0 is shaped like the third waveform provided in FIG. 4. The root mean square voltage is VON.

For a non-visible pixel like SEG0-COM1, the root mean square voltage is VOFF and is lower than VON, as can be seen in FIG. 4. If the liquid crystal materials used in the display panel are made in a way that VON is higher than the threshold to get full crystals rotation and VOFF is unable to get sufficient crystals rotation, it results in the image displayed in FIG. 4.

FIG. 5 illustrates waveforms for the same type of display panel as in FIG. 4, but having 2 visible pixels. The waveforms of COMMONS are exactly the same as in FIG. 4 because they do not depend on the data to be displayed. However, the SEG0 waveform is slightly different from the SEG0 waveform in FIG. 4. On the second part of the frame period, the SEG0 receives the data for pixel SEG0-COM1. If it must be visible, then this part of the waveform (second ⅓ of the frame period) is the same as the first part, VLCD followed by GND. As a result, the difference of voltage across SEG0-COM0 is different in terms of shape, but remains the same for its root mean square VON and the SEG0-COM1 is modified compared to FIG. 4 and is now VON. Therefore, two pixels are visible.

Some modes of operation can provide capabilities to make the image, or part of the image, blink. These type of modes of operation are well known with respect to electronic appliances that display time, where the second event is materialized by a blinking ":" character, but the time is not blinking.

If the entire image is blinking, then the prior art architecture described in FIG. 2 can be used. Depending on the user configuration programmed in configuration register 211, the blinking frequency information carried on part of signal 201 (LCDBLKFREQ) may be different from 0. Then, timing generation module 202 drives signal 223 with a square waveform. When signal 223 is cleared, the set of AND gates 206 clear data received from display frame buffer 205 and the image is blanked. When not cleared, signal 223 allows the image to be visible, this being the energized period of the blinking period.

The logic to perform this kind of blinking can be very simple with AND gate 206 and square wave signal generation 223. However, in order to have the intermediate voltages as can be seen on the non-energized part of SEG0 in FIG. 6, the resistor ladder must be active, thereby consuming energy. Moreover, the pixels are slightly energized even if they are not visible, which also consumes energy.

SUMMARY

In a preferred embodiment, the present invention mainly takes place in a TN LCD controller that interfaces LCD displays. However, it is contemplated that other applications are within the scope of the present invention as well.

The present invention reduces the overall power consumption of a microcontroller using such a display controller, especially when the display controller is the only active logic in the microcontroller for some modes of operation. When an application (watch, remote control, calculator, digital camera, etc.) is in standby/low power mode, some images may still appear on the display panel to inform user about their mode of operation (standby, advertising, etc.). They may appear blinking, like the well known ":" blinking character in watches while the time is constantly displayed, but may be more simple by blanking the whole image for a period of time. The present invention is directed towards a mode of operation for simple blinking display.

The circuitry of the present invention enables the reduction of the power consumption of such blinking mode for multiplexed TN LCD controllers. For the blank period, the LCD display controller of the invention drives all the segments and commons terminals of the LCD panel to logical 0 and the resistor ladder generating the intermediate voltages is switched off. Therefore, in this mode of operation, the power consumption is reduced compared to a display controller that would clear the image data buffer for the blank period, where intermediate voltages are required and the resistor ladder is consuming power.

The present invention provides a reduced power consumption blinking mode. This feature is especially useful in final applications where an electronic appliance is battery powered.

In one embodiment, a display controller for providing signals to a discrete display panel unit is disclosed. The display controller comprises a first set of registers configured to hold data to be displayed and a first logic circuitry connected to the first set of registers. The first logic circuitry is configured to receive the data from the first set of registers, generate the signal waveforms required by the discrete display panel according to the data, and provide the signal waveforms to the discrete display panel. The controller further comprises a second logic circuitry connected to the first logic circuitry. The second logic circuitry is configured to generate timing signals for timing the first logic circuitry providing the signal waveforms to the discrete display panel. The controller also comprises a resistor ladder connected to the second logic circuitry. The resistor ladder is configured to generate intermediate voltages required to drive the discrete display panel. The resistor ladder is also configured to receive the timing signals from the second logic circuitry. The controller is configured to automatically and periodically disable the resistor ladder according to one of the generated timing signals.

In another embodiment, a method for reducing power consumption in a display controller is disclosed. The controller has a first set of registers, a first logic circuitry connected to the first set of registers, a second logic circuitry connected to the first logic circuitry, and a resistor ladder connected to the second logic circuitry and configured to generate intermediate voltages. The method comprises the first set of registers holding data to be displayed on a discrete display panel. The second logic circuitry generates timing signals that alternate between different values, and transmits a generated timing signal to the first logic circuitry and the resistor ladder. The first set of registers transmits the held data to the first logic circuitry. The first logic circuitry receives the timing signal from the second logic circuitry and the data from the first set of registers. The first logic circuitry generates signal waveforms required by the discrete display panel according to the received data. The first logic circuitry transmits the generated signal waveforms to the discrete display panel. The resistor ladder receives a timing signal from the second logic circuitry. When the received timing signal has a first value, the resistor ladder does not generate any intermediate voltages. When the received timing signal has a second value different from the first value, the resistor ladder generates intermediate voltages and transmits the generated intermediate voltages to the discrete display panel.

DETAILED DESCRIPTION

Persons of ordinary skill in the art will realize that the following disclosure is illustrative only and not in any way limiting. Other embodiments of the invention will readily suggest themselves to such skilled persons having the benefit of this disclosure.

Figure 7:
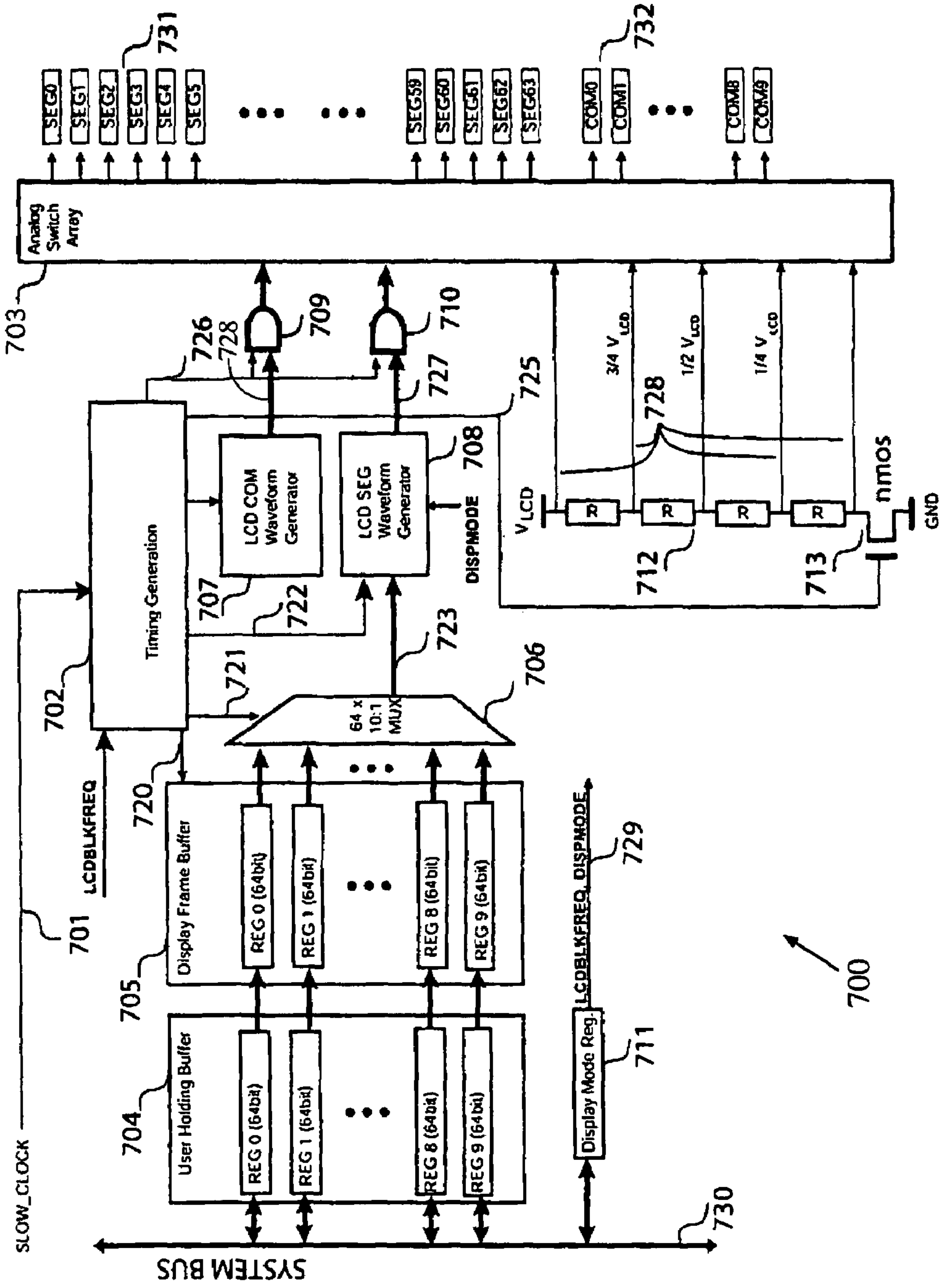
FIG. 7 is a schematic diagram of an LCD display controller architecture in accordance with the principles of the present invention.
Figure 8:
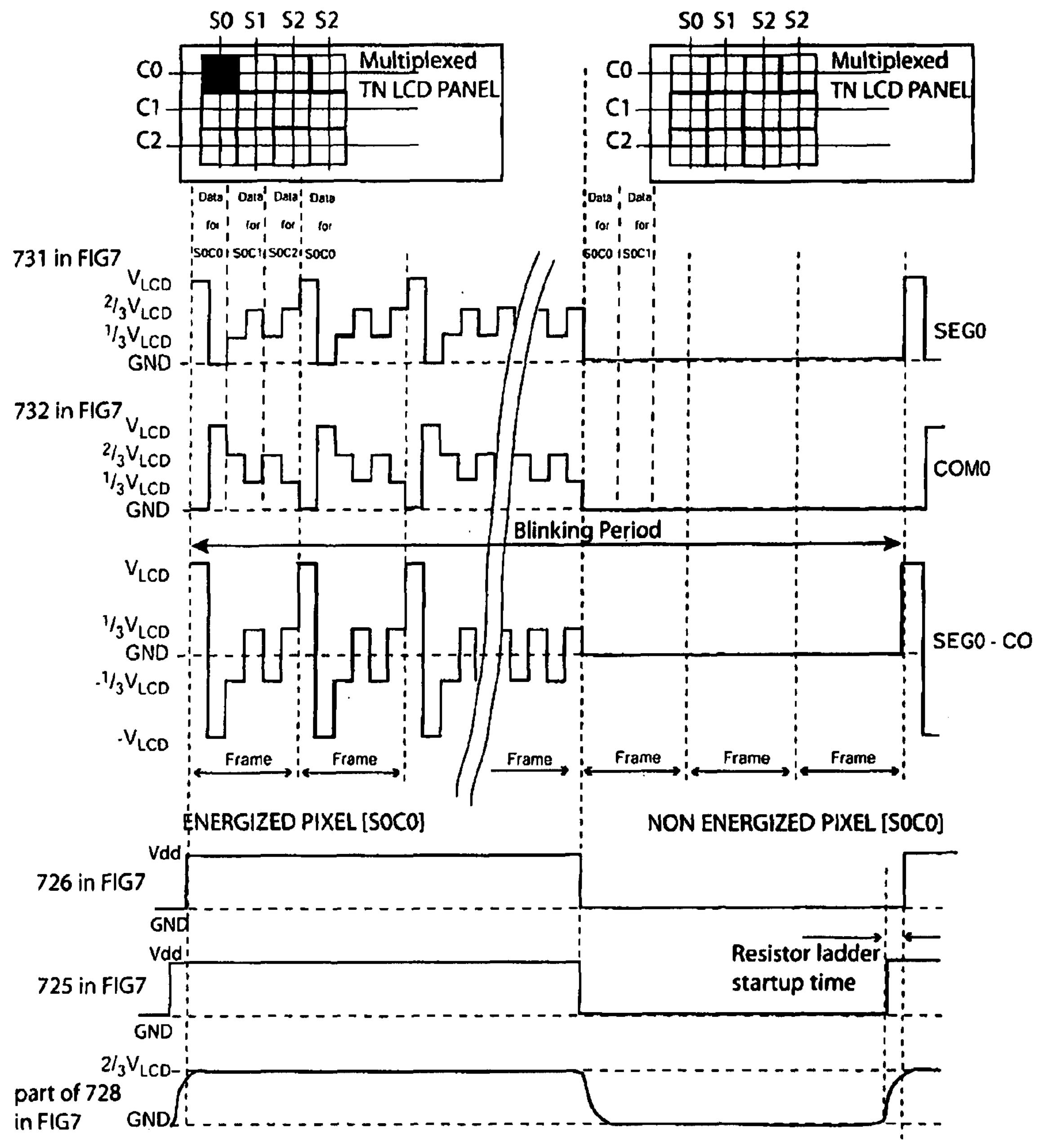
FIG. 8 illustrates blinking pixel waveforms on multiplexed LCD panels in accordance with the principles of the present invention.

FIG. 7 is a schematic diagram of an LCD controller architecture 700 in accordance with the principles of the present invention. LCD controller architecture 700 shares similarities with controller circuitry 200 in FIG. 2. However, architecture 700 has been modified in order to overcome the deficiencies of the prior art.

Figure 1:
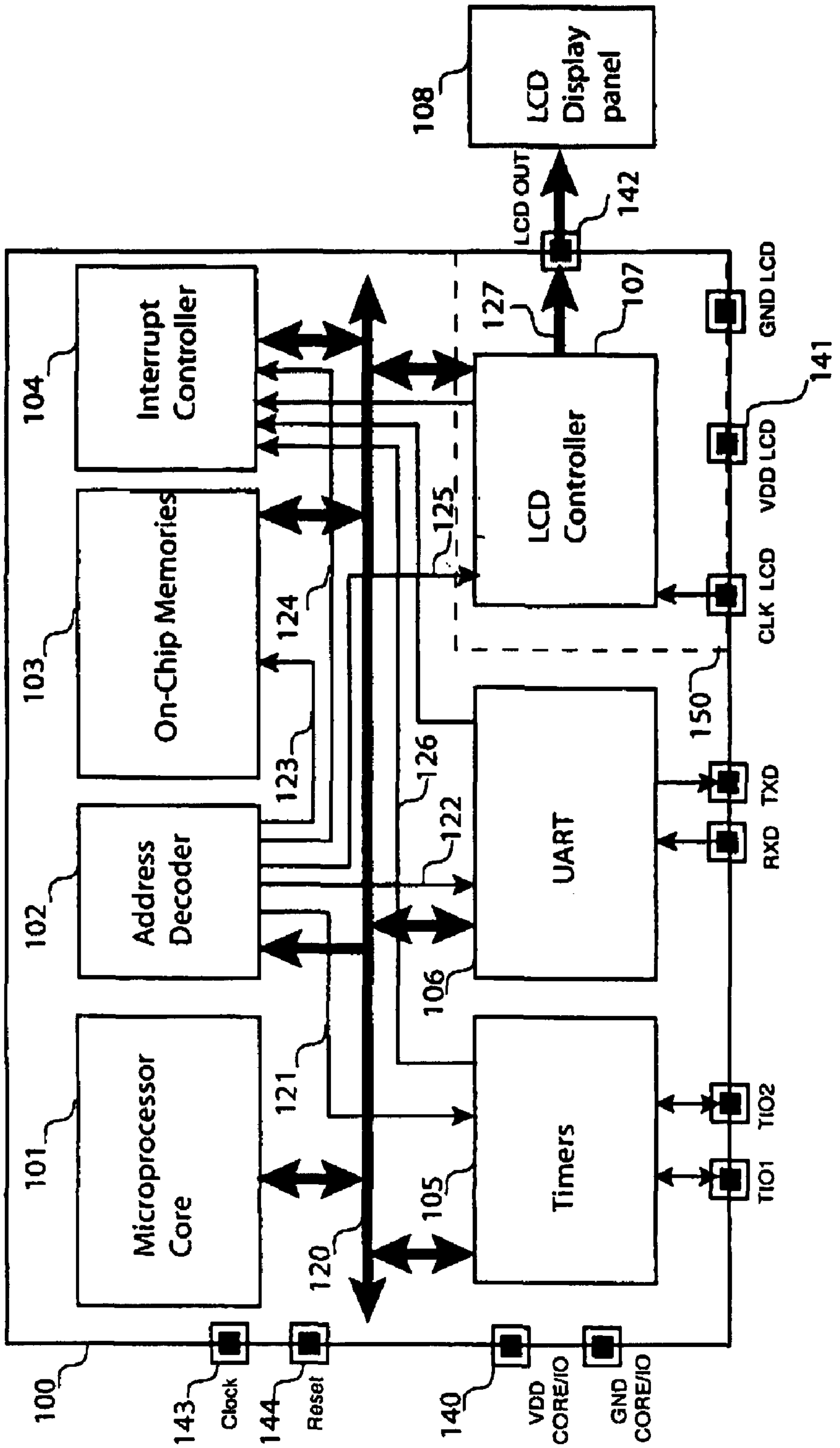
FIG. 1 (Prior Art)
FIG. 1 is a schematic diagram of a prior art microcontroller with an embedded LCD display controller.
Figure 2:
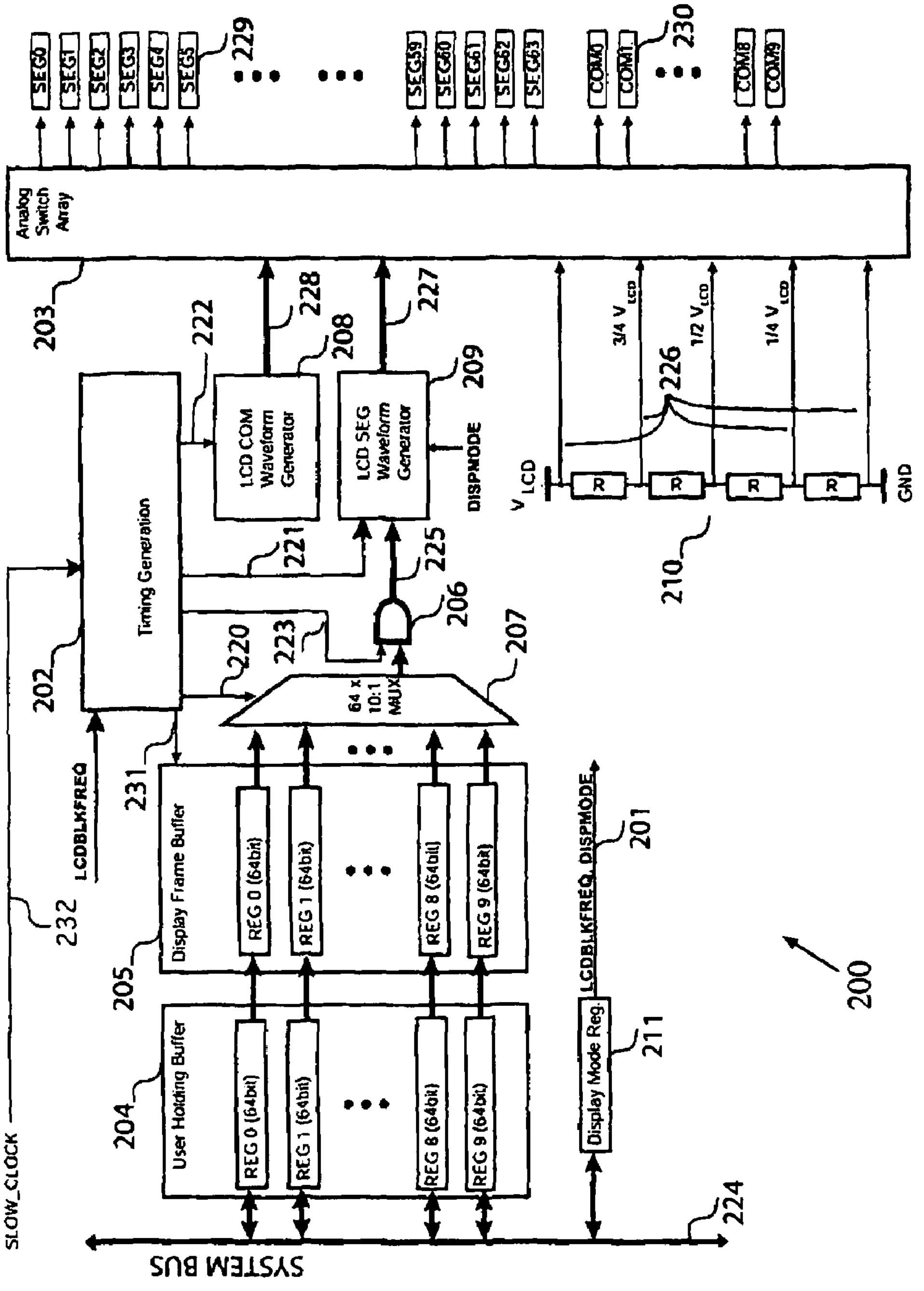
FIG. 2 (Prior Art)
FIG. 2 is a schematic diagram illustrating a prior art LCD display controller architecture.
Figure 3:
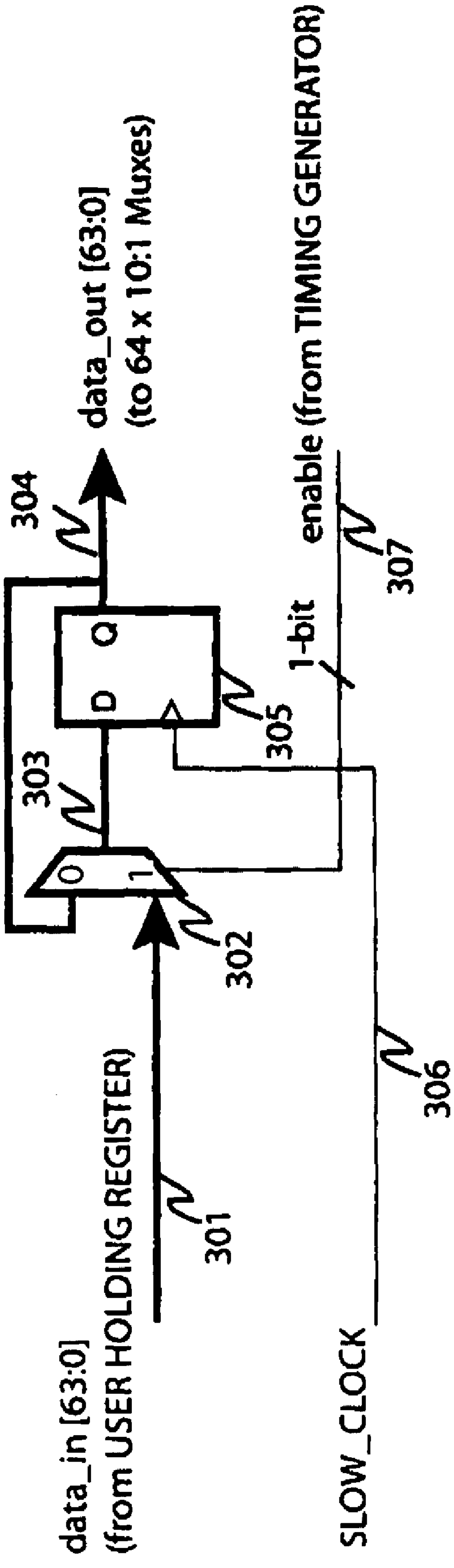
FIG. 3 is a schematic diagram illustrating a register within a display frame buffer.

As seen in FIGS. 2 and 7, architecture 700 may comprise substantially the same structural and functional arrangement from the system bus to the multiplexer directly connected to the timing generation module as circuitry 200. In FIG. 7, the display controller circuitry 700 is connected to the system bus 730 to receive and provide data to the microprocessor. A user holding buffer 704, connected to system bus 730, comprises a series of registers to store the bit stream for the image to display. These registers can be loaded with the data value carried on system bus 730. Similar to circuitry 200, there may be a need for an internal address decoder (not shown).

The display controller circuitry 700 also comprises a display frame buffer 705, which is connected to user holding buffer 704 and contains a copy of the bit stream that is stored in data buffer 704. Loading the frame buffer 705 with the content of the user holding registers is automatically performed by timing generation circuitry 702 asserting signal 720.

The display controller 700 comprises configuration registers 711 that can be accessed at different addresses than the user holding registers. Configuration registers 711 provide the mode of operations 729 of the display controller, which can include, but is not limited to, the blinking frequency “LCDBLKFREQ” and the display mode “DISPMODE.”

Considering the blinking mode, the displayed data results in two periods: one period with an energized image according to the bit stream located in the display frame buffer 705 and the other period where all dots are blanked. The multiplexing technique may be used to provide data to the LCD panel. Therefore, both internal buffers are organized accordingly. There are as many outputs as common to address in the LCD panel for each buffer. The multiplexed LCD panel consists of a series of terminals organized as a matrix. There are several common terminals usually called “COMMON.” Each of these common terminals accesses several other terminals called “SEGMENT” of the LCD panels through a capacitor whose dielectric is filled with liquid crystal. For example, for a 10 COMMONS×64 SEGMENTS LCD panel, the display controller data buffer will be organized as 10 64-bit registers, as seen in FIG. 7 with reference to user holding buffer 704 and display frame buffer 705.

Therefore, these registers must be multiplexed. The display controller 700 comprises 64×10:1 multiplexer 706. These multiplexers have their select inputs driven by the timing generation module 702 by means of signal 721. Each register of the frame buffer 705 is periodically selected for a frame period This frame period depends on the number of commons addressed on the LCD panel and also on other parameters, including the clock frequency divider (division of clock signal 701). The divider circuitry may be contained in the timing generation module 702. As discussed above, this clock frequency divider is not mandatory. However, it is common to use a watch crystal oscillator to drive the display circuitry.

The output 723 of multiplexer 706 is connected to SEGMENT waveform generator 708, thereby providing the data to be displayed. The type of LCD panel to be addressed is configured by user through signal 729 (DISPMODE).

Waveform generator module 708 provides different waveforms according to the data to be displayed (either energized pixel or non-energized, a pixel being the area formed by the cross-over of a SEGMENT and a COMMON). The waveform also depends on the time slot location. During a COMMON terminal duration period, one can distinguish 2 different areas. These areas are signaled by timing generation circuitry 702 by means of signal 722.

Figure 4:
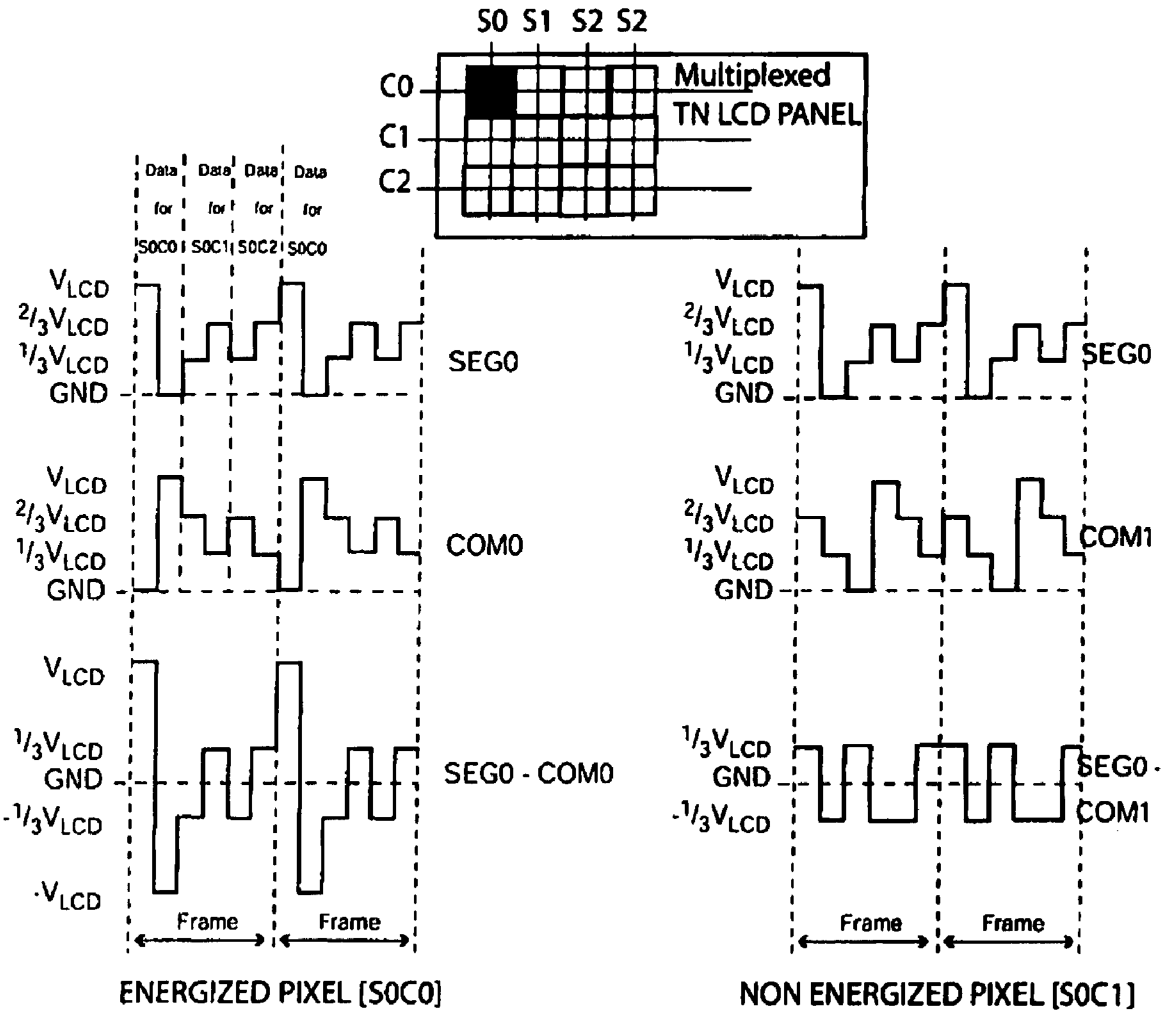
FIG. 4 illustrates multiplexed TN LCD waveforms for three COMMONS with one energized pixel.
Figure 5:
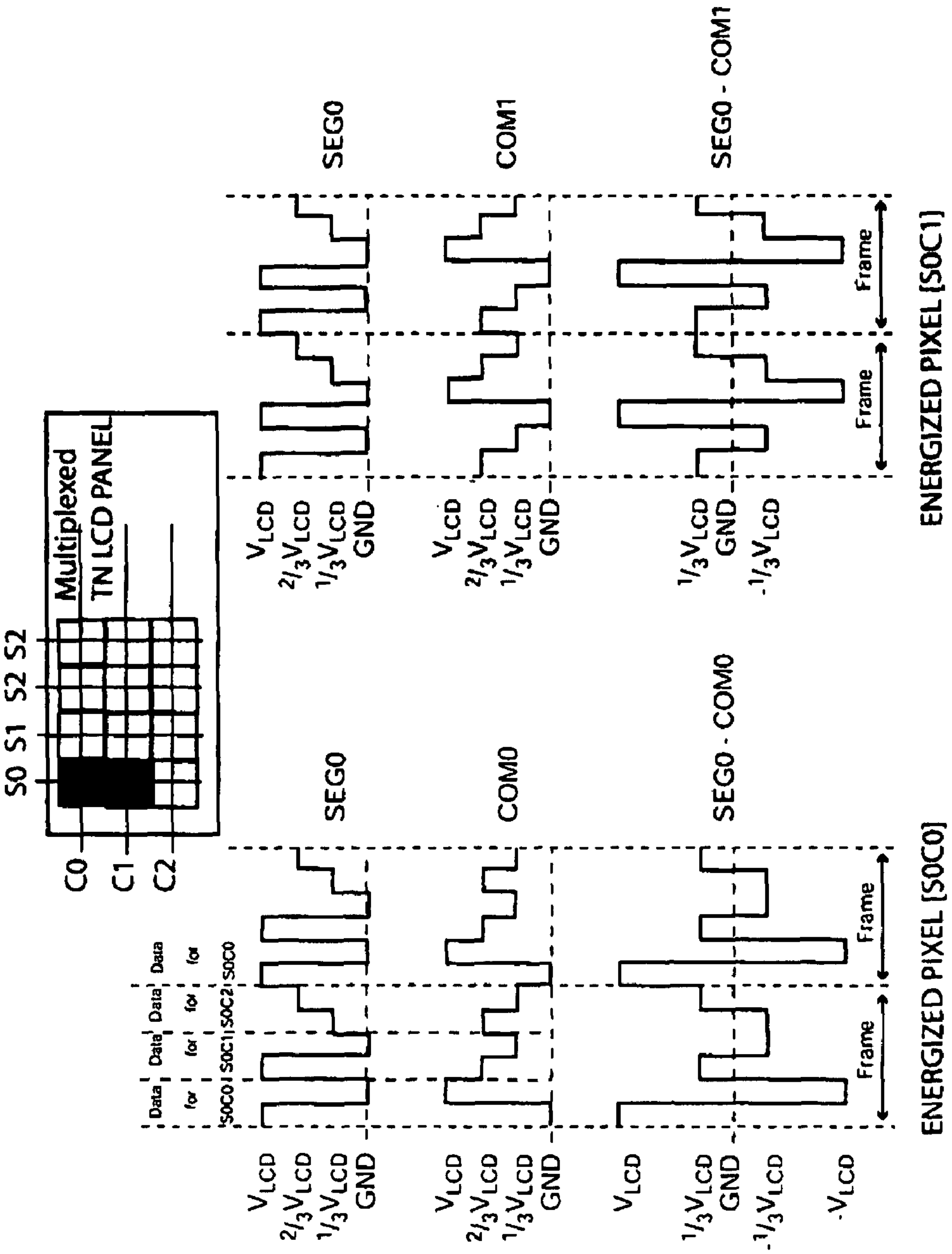
FIG. 5 illustrates multiplexed TN LCD waveforms for three COMMONS with two energized pixels.
Figure 6:
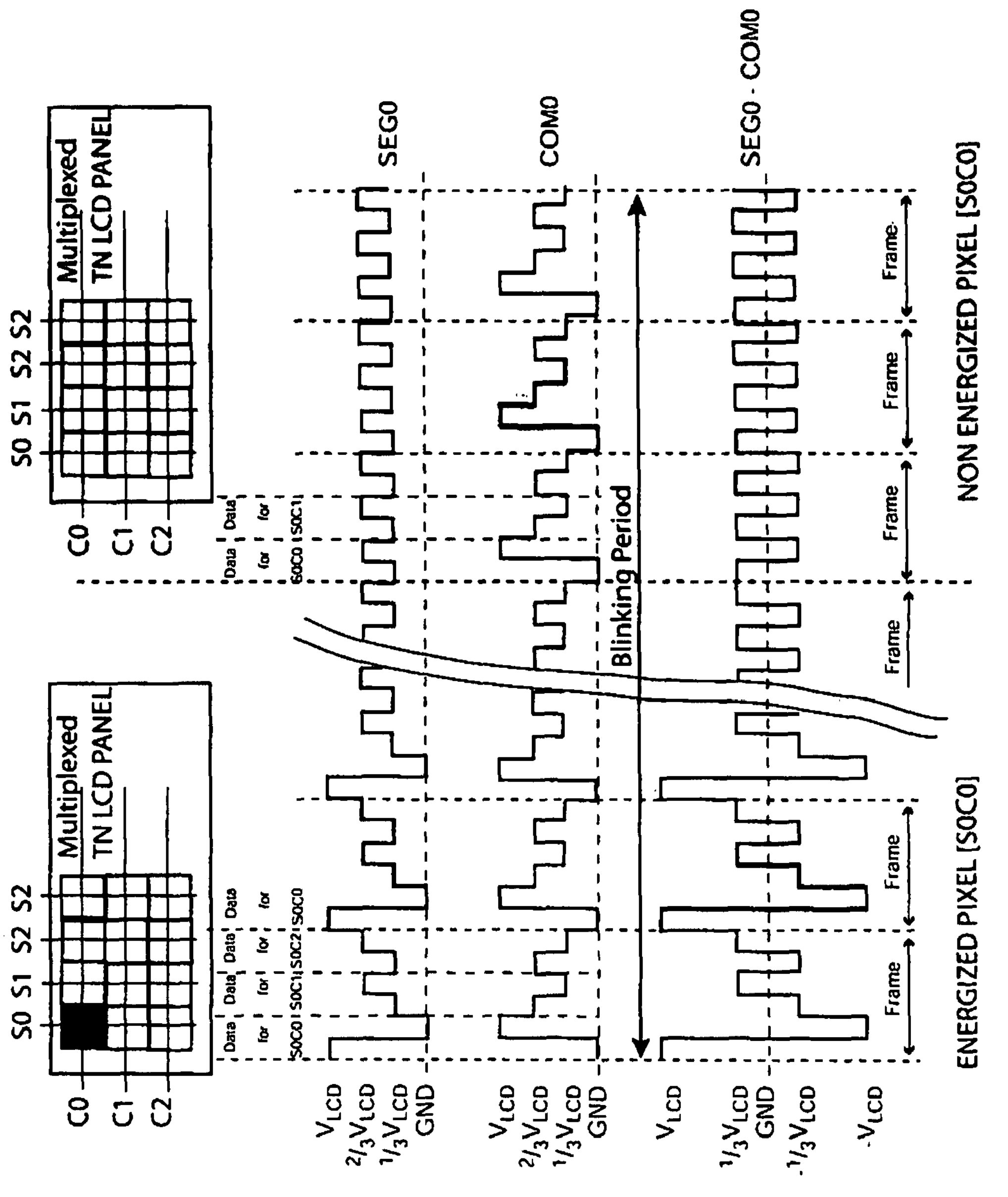
FIG. 6 illustrates blinking pixel waveforms on multiplexed LCD panels.

Waveform generator 708 is a digital module and does not generate the direct waveform that is described in FIG. 4, but rather provides the command selection inputs to AND gate 710, which relays the command selection inputs to the associated analog multiplexers of switch array 703 when it receives the appropriate input.

Analog switch array 703 is an array of analog multiplexers (one for each terminal of the LCD display panel) that select among four voltages provided by a resistor ladder 712. Resistor ladder 712 acts as a voltage divider, providing all required voltage values ¾ VDD, ½ VDD, and ¼ VDD carried by signals 728. Each analog multiplexer of module 703 comprises a selection input driven by the SEGMENT waveform generator 708 for segment terminals 731 via line 727 and the output of AND gate 710 or the COMMON waveform generator 722 for the common terminals 732 via line 728 and the output of AND gate 709. COMMON waveform generator 709 and SEGMENT waveform generator 708 may be signaled by timing generation circuitry 702 by means of signal 726. There are analog multiplexers for common terminals 230 and analog multiplexers for segment terminals 229.

Architecture 700 suppresses the above-mentioned problems of circuitry 200 by adding a set of AND gates 709 and 710 after COMMON waveform generator 707 and SEGMENT waveform generator 708. Therefore, the set of AND gates 709 and 710 are able to directly clear the commands of all multiplexers within the analog switch array 703 when the signal 726 is cleared. All multiplexers select the logical "GROUND" in such a case. Therefore, the resistor ladder 712 is no longer required and can be switched off. In a preferred embodiment, resistor ladder 712 can be switched off by means of a transistor, such as NMOS transistor 713, by timing generation module 702 applying a logical 0 on net 725. This switching off of resistor ladder 712 is performed during the blank period. When net 725 is set to logical 1, the NMOS transistor 712 is ON and the current flows through resistors, thereby providing the required voltages on all nets 728.

Although AND gates are used in the exemplary embodiment illustrated in FIG. 7, it is contemplated that a variety of different logic gates may be employed, including, but not limited to, NAND gates, OR gates, NOR gates, or a combination of any of these components. The polarity of the control/command signal 727 would be adjusted accordingly in order to accommodate the particular logic gate configuration.

The clearing of SEGMENTS and COMMONS terminals may be performed with another signal 726. This configuration is not mandatory. However, it may allow architecture 700 to take into account a startup time in resistor ladder 712.

When the blinking mode of operation is activated by means of configuration register 711 providing the "LCDBLKFREQ" information (part select of 729), the timing generation module 702 generates both command signal 725 and 726.

This technique can be used no matter what the number of common terminals on LCD panel is. However, the best result in terms of display quality will be achieved for LCD panels having a limited number of common terminals. Up to four COMMONS provides a correct result. In fact, in LCD panels having a significant number of COMMON terminals, the multiplexing results in a very small difference between the RMS voltage across a visible pixel and a non-visible pixel. The more COMMON terminals there are, the less of a voltage difference there is. This leads to a slight grey tint on non-visible pixels instead of the pixels being fully invisible. When switching the waveforms off, the pixels are fully invisible. Therefore, in blinking mode, for each non-visible pixel, there is a blinking transition effect from slight grey tint to invisible, which may result in an undesirable lack of elegance. This problem of the slight grey tint remains imperceptible for 2, 3 or 4 COMMON terminal LCD panels.

Figure 9:
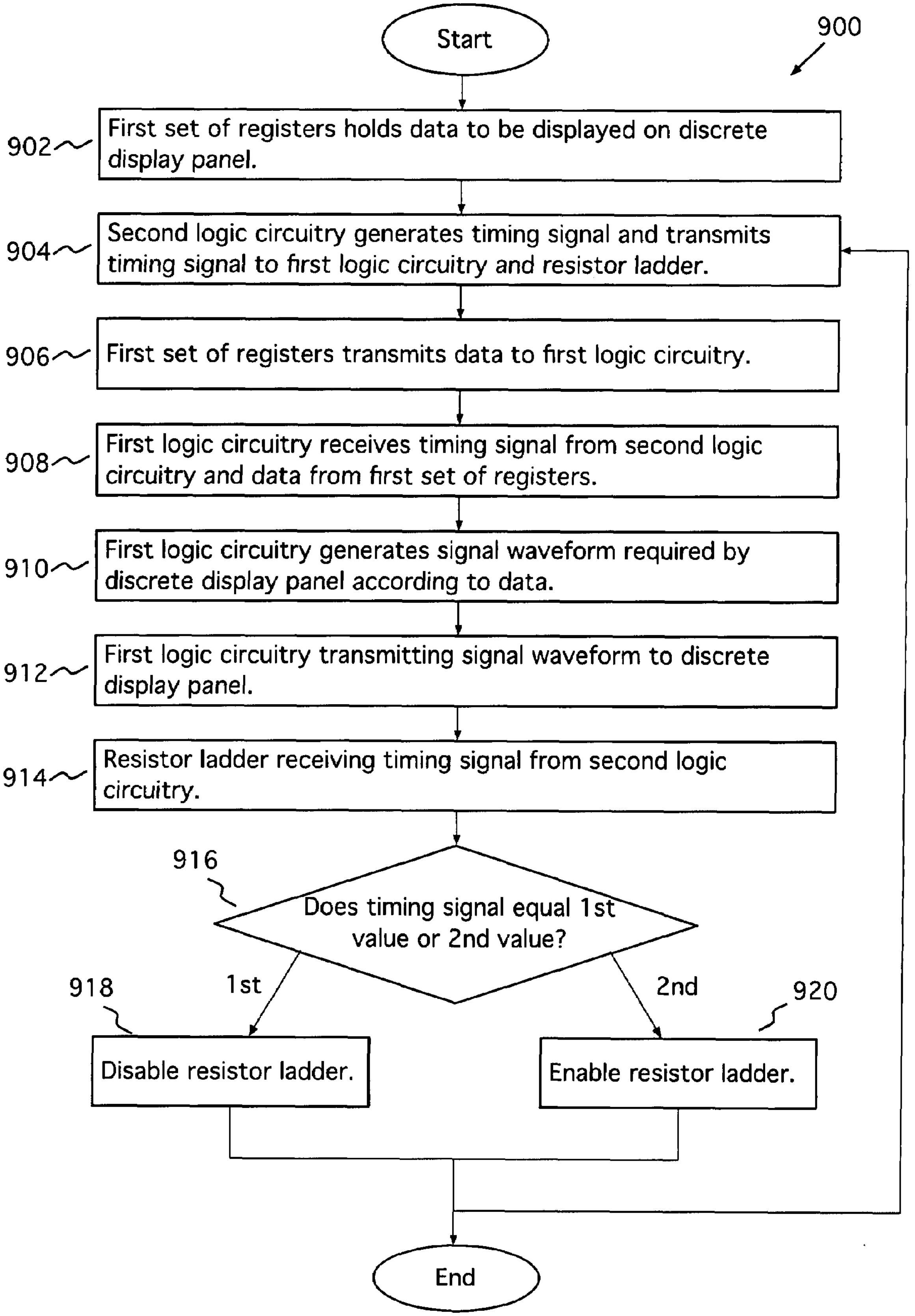
FIG. 9 is flow diagram illustrating a method for reducing power consumption in a display controller for a discrete display panel in accordance with the principles of the present invention.

FIG. 9 is flow diagram illustrating a method 900 for reducing power consumption in a display controller for a discrete display panel in accordance with the principles of the present invention. At step 902, the first set of registers holds data to be displayed on a discrete display panel. At step 904, the second logic circuitry generates timing signals and transmits a generated timing signal to the first logic circuitry and the resistor ladder. At step 906, the first set of registers transmits the data to the first logic circuitry. At step 908, the first logic circuitry receives the timing signal from the second logic circuitry and the data from the first set of registers. At step 910, the first logic circuitry generates signal waveforms required by the discrete display panel according to the received data. At step 912, the first logic circuitry transmits the generated signal waveforms to the discrete display panel. At step 914, the resistor ladder receives a timing signal from the second logic circuitry. At step 916 it is determined whether the timing signal is equal to a first value associated with disabling the resistor ladder, such as logical 0, or a second value associated with enabling the resistor ladder, such as logical 1. If the timing signal is equal to the first value, then the resistor ladder is disabled, or remains disabled, at step 918. While disabled, the resistor ladder does not generate any intermediate voltages. If the timing signal is equal to the second value, then the resistor ladder is enabled, or remains enabled, at step 920. While enabled, the resistor ladder generates intermediate voltages and transmits the generated intermediate voltages to the discrete display panel. The process may then either repeat at step 904 or come to an end.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention.

What is claimed is:

1. A discrete display panel controller comprising:

a first set of registers configured to hold data to be displayed;

first logic circuitry connected to said first set of registers, said first logic circuitry configured to receive said data from said first set of registers, generate signal waveforms to be received by a discrete display panel according to said data, and provide said signal waveforms to said discrete display panel;

second logic circuitry connected to said first logic circuitry, said second logic circuitry configured to generate timing signals for timing said first logic circuitry; and a resistor ladder connected to said second logic circuitry, said resistor ladder configured to generate intermediate voltages to drive said discrete display panel, and configured to receive said timing signals from said second logic circuitry, wherein said controller is configured to automatically and periodically disable said resistor ladder according to one of said timing signals, while preventing said signal waveforms from arriving at said discrete display panel by gating and clearing said signal waveforms after being generated by the first logic circuitry.

2. The controller of claim 1, further comprising a logic gate to provide the gating and connected to said first logic circuitry and said second logic circuitry, said logic gate configured to receive said signal waveforms from said first logic circuitry, receive said timing signals from said second logic circuitry, and provide said received signal waveforms to said discrete display panel.

3. The controller of claim 2, wherein said logic gate is an AND gate.

4. The controller of claim 1, further comprising a transistor connected between said second logic circuitry and said resistor ladder, wherein said transistor is configured to receive said timing signals and disable said resistor ladder according to one of said timing signals.

5. The controller of claim 1, wherein said controller is configured to clear said signal waveforms provided to said discrete display panel for a period of time corresponding approximately to the period of time said resistor ladder is disabled.

6. The controller of claim 1, wherein the discrete display panel is a multiple common terminal twisted nematic liquid crystal display panel.

7. The controller of claim 1, wherein said controller is connected in a system using a microprocessor, said microprocessor configured to access said first set of registers.

8. The controller of claim 1, wherein said controller is disposed in a microcontroller integrated circuit.

9. The controller of claim 8, wherein said microcontroller integrated circuit comprises.

a first set of input terminals configured to supply power to said display controller; and a second set of input terminals configured to supply power to said microprocessor, wherein said first set of input terminals and said second set of input terminals are disconnected within said microcontroller integrated circuit.

10. The controller of claim 1, further comprising a second set of registers connected to said second logic circuitry and between said first set of registers and said first logic circuitry, said second set of registers configured to receive timing signals from said second logic circuitry and load said data from said first set of registers periodically based on said received timing signals.

11. The controller of claim 1, further comprising a multiplexer connected to said second logic circuitry and between said first set of registers and said first logic circuitry, said multiplexer configured to receive at least some of the timing signals from said second logic circuitry, receive said data from said first set of registers, and provide said data to said first logic circuitry based on said received timing signals.

12. A method comprising:

holding data in a first set of registers included in a display controller, the data to be displayed on a discrete display panel;

using second logic circuitry in the controller to generate timing signals alternating between different values, and to transmit at least a first one of the timing signals to first logic circuitry in the controller and a resistor ladder in the controller;

transmitting said held data from said first set of registers to said first logic circuitry;

receiving said at least the first one of said timing signals at said first logic circuitry from said second logic circuitry, and receiving said data from said first set of registers;

generating signal waveforms by said first logic circuitry according to said received data;

transmitting said signal waveforms from said first logic circuitry to said discrete display panel;

periodically preventing the arrival of said signal waveforms at said discrete display panel by gating and using said controller to clear said signal waveforms after being generated by said first logic circuitry;

receiving at least a second one of the timing signals at said resistor ladder from said second logic circuitry;

not generating any intermediate voltages by said resistor ladder at some time during the preventing and when said received at least the second one of the timing signals has a first value; and generating intermediate voltages by said resistor ladder and transmitting said generated intermediate voltages from said resistor ladder to said discrete display panel when said received at least the second one of the timing signals has a second value different from said first value.

13. The method of claim 12, wherein said display controller further comprises a logic gate connected to said first logic circuitry and said second logic circuitry, and said method further comprises:

receiving a signal waveform from said first logic circuitry at said logic gate;

receiving a timing signal from said second logic circuitry; and transmitting said received signal waveform to said discrete display panel when the arrival of said received signal waveform is not being prevented.

14. The method of claim 13, wherein receiving the signal waveform further comprises:

receiving the signal waveform at said logic gate as an AND gate.

15. The method of claim 12, wherein said display controller further comprises a transistor connected between said second logic circuitry and said resistor ladder, and said method further comprises:

receiving said timing signal from said second logic circuitry at said transistor; and disabling said resistor ladder by said transistor according to said received timing signal.

16. The method of claim 12, further comprising:

clearing, using said controller, said signal waveforms provided to said discrete display panel for a period of time corresponding approximately to the period of time said resistor ladder is not generating any intermediate voltages.

17. The method of claim 12, wherein the data is to be displayed on the discrete display panel comprising a multiple common terminal twisted nematic liquid crystal display panel.

18. The method of claim 12, wherein said controller is connected in a system using a microprocessor, comprising:

accessing said first set of registers with said microprocessor.

19. The method of claim 12, comprising:

periodically clearing said signal waveforms using said controller disposed in a microcontroller integrated circuit.

20. The method of claim 12, wherein said display controller further comprises a second set of registers connected to said second logic circuitry and between said first set of registers and said first logic circuitry, wherein said method further comprises:

receiving timing signals from said second logic circuitry at said second set of registers; and loading said held data by said second set of registers from said first set of registers periodically based on said received timing signals.

21. The method of claim 12, wherein said display controller further comprises a multiplexer connected to said second logic circuitry and between said first set of registers and said first logic circuitry, said method comprising:

receiving timing signals by said multiplexer from said second logic circuitry;

receiving said held data by said multiplexer from said first set of registers; and transmitting said data by said multiplexer to said first logic circuitry based on said received timing signals.

* * * * *